US006953757B2

(12) United States Patent
Zoitos et al.

(10) Patent No.: US 6,953,757 B2
(45) Date of Patent: Oct. 11, 2005

(54) HIGH TEMPERATURE A RESISTANT VITREOUS INORGANIC FIBER

(75) Inventors: Bruce K. Zoitos, Buffalo, NY (US); Michael J. Andrejcak, Niagara Falls, NY (US); Terry N. Travis, South Bend, IN (US)

(73) Assignee: Unifrax Corporation, Niagara Falls, NY (US)

( * ) Notice: Subject to any disclaimer, the term of this patent is extended or adjusted under 35 U.S.C. 154(b) by 156 days.

(21) Appl. No.: 10/339,838

(22) Filed: Jan. 10, 2003

(65) Prior Publication Data

US 2003/0162019 A1 Aug. 28, 2003

Related U.S. Application Data

(60) Provisional application No. 60/347,590, filed on Jan. 10, 2002.

(51) Int. Cl.[7] .......................... C03C 13/02; C03C 13/06
(52) U.S. Cl. .................................. 501/35; 50/36; 50/38
(58) Field of Search ............................. 501/35, 36, 38

(56) References Cited

U.S. PATENT DOCUMENTS

| | | |
|---|---|---|
| 1,759,919 A | 5/1930 | Singer |
| 2,051,279 A | 8/1936 | Thorndyke |
| 2,335,220 A | 11/1943 | Edwards |
| 2,576,312 A | 11/1951 | Minnick |
| 3,183,104 A | 5/1965 | Thomas |
| 3,189,471 A | 6/1965 | Thomas |
| 3,348,994 A | 10/1967 | Rees et al. |
| 3,380,818 A | 4/1968 | Smith |
| 3,402,055 A | 9/1968 | Harris et al. |
| 3,459,568 A | 8/1969 | Rinehart |
| 3,573,078 A | 3/1971 | Bacon |
| 3,597,179 A | 8/1971 | Simmons |
| 3,687,850 A | 8/1972 | Gagin |
| 3,783,092 A | 1/1974 | Majumdar |
| 3,799,836 A | 3/1974 | Rogers et al. |
| 3,804,608 A | 4/1974 | Gaskell et al. |
| 3,804,646 A | 4/1974 | Dumbaugh, Jr. |
| 3,854,986 A | 12/1974 | Chvalovsky et al. |
| 3,887,386 A | 6/1975 | Majumdar |
| 3,900,329 A | 8/1975 | Grubb et al. |
| 3,904,424 A | 9/1975 | Aoki et al. |
| 4,002,482 A | 1/1977 | Coenen |
| 4,011,651 A | 3/1977 | Bradbury et al. |
| 4,036,654 A | 7/1977 | Yale et al. |
| 4,046,948 A | 9/1977 | Zlochower |
| 4,078,939 A | 3/1978 | Schwochow |
| 4,102,692 A | 7/1978 | Schartau et al. |
| 4,303,722 A | 12/1981 | Pilgrim |
| 4,363,878 A | 12/1982 | Yamamoto et al. |
| 4,366,251 A | 12/1982 | Rapp |
| 4,379,111 A | 4/1983 | Smith et al. |
| 4,387,180 A | 6/1983 | Jen et al. |
| 4,461,840 A | 7/1984 | Massol et al. |
| 4,492,722 A | 1/1985 | Ritter, II et al. |
| 4,542,106 A | 9/1985 | Sproull |
| 4,558,015 A | 12/1985 | Ekdahl et al. |
| 4,604,097 A | 8/1986 | Graves, Jr. et al. |

(Continued)

FOREIGN PATENT DOCUMENTS

| | | |
|---|---|---|
| AU | 255803 | 7/1963 |
| CA | 2043699 | 6/1990 |
| CA | 1271785 | 7/1990 |
| CA | 2017344 | 11/1990 |
| EP | 144 349 | 6/1985 |
| EP | 076 677 | 1/1986 |
| EP | 390 223 | 10/1990 |
| EP | 399 320 | 11/1990 |
| EP | 412 878 | 2/1991 |
| EP | 459 897 | 12/1991 |
| EP | 1 323 687 | 7/2003 |
| FR | 2662687 | 6/1990 |
| GB | 520247 | 4/1939 |
| GB | 810773 | 3/1959 |
| GB | 1209244 | 10/1970 |
| GB | 2383793 | 7/2003 |
| JP | 51-13819 | 2/1976 |
| JP | 51-133311 | 11/1976 |
| WO | WO 84/04296 | 11/1984 |
| WO | WO 85/02393 | 6/1985 |
| WO | WO 85/02394 | 6/1985 |
| WO | WO 87/05007 | 8/1987 |

(Continued)

OTHER PUBLICATIONS

Hayashi, Kunio et al. "Densification of Compacted Magnesium Alumino–Silicate Glass Powders," *Journal of the Ceramic Society of Japan,* Int. Edition, vol. 98.

Shyu, Jiin–Jyh and Wu, Jenn–Ming. "Effect of $TiO_2$ addition on the nucleation of apatite in an $MgO$–$CaO$–$SiO$–$P_2O_5$ glass," *Journal of Materials Science Letters,* vol. 10, 1991.

Vogel, Werner and Höland, Wolfram. "Nucleation and crystallization kinetics of an $MgO$–$Al_2O_3$–$SiO_2$ base glass with various dopants," pp. 125–145.

Wallenberger, Frederick T. "Inviscid Melt Spinning of Alumina Fibers: Chemical Jet Stabilization," *Journal of the American Ceramic Society,* vol. 75, No. 3, 1992.

Alexander, Iain C. and Jubb, Gary A. "Development of a soluble high–temperature fibre," *Glastech. Ber. Glass Sci. Technol.,* vol. 70, No. 12, 1997.

Maier et al. *Nucleation and Crystallization in Mg–Al silicate–glass–ceramics,* cfi/ber.DKG 6/7, 1988, pp. 208–212.

Primary Examiner—Karl Group
(74) *Attorney, Agent, or Firm*—Curatolo Sidoti Co., LPA; Joseph G. Curatolo; Salvatore A. Sidoti (57) ABSTRACT

A low shrinkage, high temperature resistant vitreous inorganic fiber having a use temperature up to at least 1330° C., which maintains mechanical integrity after exposure to the use temperature and which is non-durable in physiological fluids, is prepared by the method of forming a melt with ingredients including greater than 71.25 weight percent silica, 0 to about 20 weight percent magnesia, and about 5 to about 28.55 weight percent of calcia, 0 to about 5 weight percent zirconia, and optionally a viscosity modifier in an amount effective to render the product fiberizable; and producing fibers from the melt.

56 Claims, 4 Drawing Sheets

U.S. PATENT DOCUMENTS

| | | |
|---|---|---|
| 4,615,988 A | 10/1986 | Le Moigne et al. |
| 4,778,499 A | 10/1988 | Beaver |
| 4,933,307 A | 6/1990 | Marshall et al. |
| 5,055,428 A | 10/1991 | Porter |
| 5,064,785 A | 11/1991 | Kawamoto et al. |
| 5,108,957 A | 4/1992 | Cohen et al. |
| 5,250,488 A | 10/1993 | Thelohan et al. |
| 5,284,807 A | 2/1994 | Komori et al. |
| 5,332,699 A | 7/1994 | Olds et al. |
| 5,569,629 A | 10/1996 | TenEyck et al. |
| 5,583,080 A | 12/1996 | Guldberg et al. |
| 5,585,312 A | 12/1996 | TenEyck et al. |
| 5,714,421 A | 2/1998 | Olds et al. |
| 5,811,360 A | 9/1998 | Jubb |
| 5,821,183 A | 10/1998 | Jubb |
| 5,874,375 A | 2/1999 | Zoitos et al. |
| 5,928,975 A | 7/1999 | Jubb |
| 5,955,389 A | 9/1999 | Jubb |
| 5,962,354 A | 10/1999 | Fyles et al. .................. 501/36 |
| 5,994,247 A | 11/1999 | Jubb et al. |
| 5,998,315 A | 12/1999 | Jubb |
| 6,025,288 A | 2/2000 | Zoitos et al. |
| 6,030,910 A | 2/2000 | Zoitos et al. |
| 6,180,546 B1 | 1/2001 | Jubb et al. |
| 2002/0032116 A1 | 3/2002 | Jubb et al. |

FOREIGN PATENT DOCUMENTS

| | | |
|---|---|---|
| WO | WO 89/12032 | 12/1989 |
| WO | WO 90/02713 | 3/1990 |
| WO | WO 92/07801 | 5/1992 |
| WO | WO 92/09536 | 6/1992 |
| WO | WO 94/15883 | 7/1994 |
| WO | WO 93/15028 | 11/1994 |
| WO | WO 01/197744 | 3/2001 |

HIGH TEMPERATURE A RESISTANT VITREOUS INORGANIC FIBER

CROSS REFERENCE TO RELATED APPLICATIONS

This application claims the benefit of the filing date, under 35 U.S.C. §119(e), of U.S. Provisional Application for Patent Ser. No. 60/347,590, filed on Jan. 10, 2002.

BACKGROUND OF THE INVENTION

The insulation material industry has determined that it is desirable to utilize fibers in heat and sound insulating applications which are not durable in physiological fluids, such as lung fluid. While candidate materials have been proposed, the use temperature limit of these materials have not been high enough to accommodate many of the applications to which high temperature resistant fibers, including vitreous fibers and ceramic fibers, are applied. In particular, high temperature resistant fibers should exhibit minimal linear shrinkage at expected exposure temperatures, in order to provide effective thermal protection to the article being insulated.

Many compositions within the man-made vitreous fiber family of materials have been proposed which are decomposable in a physiological medium. These fibers generally have a significant alkali metal oxide content, which often results in a low use temperature limit.

Canadian Patent Application 2017344 describes a glass fiber having physiological solubility formed from glasses containing as required components silica, calcia and $Na_2O$, as preferred components, magnesia and $K_2O$, and as optional components boria, alumina, titania, iron oxides, and fluoride.

International Publication WO 90/02713 describes mineral fibers which are soluble in saline solutions, the fibers having a composition including silica, alumina, iron oxide, calcia, magnesia, $Na_2O$ and $K_2O$.

U.S. Pat. No. 5,108,957 describes glass compositions useful for forming fibers which are able to be degraded in a physiological medium containing as required components silica, calcia, $Na_2O$ plus $K_2O$, and boria, and optionally alumina, magnesia, fluoride and $P_2O_5$. It describes the presence of phosphorus as having the effect of increasing the rate of decomposition of the fibers in a physiological medium.

Other patents which cite the effect of phosphorus in favoring biological solubility of mineral fibers include International Publication WO 92/09536, describing mineral fibers containing substantially silica and calcia, but optionally magnesia and $Na_2O$ plus $K_2O$, in which the presence of phosphorus oxide decreases the stabilizing effect of aluminum and iron on the glass matrix. These fibers are typically produced at lower temperatures than refractory ceramic fibers. We have observed that at melt temperatures required for high temperature resistant fibers (1700–2000° C.), phosphorus oxide at levels as low as a few percent can cause severe degradation and/or erosion of furnace components.

Canadian Patent Application 2043699 describes fibers which decompose in the presence of a physiological medium, which contain silica, alumina, calcia, magnesia, $P_2O_5$, optionally iron oxide, and $Na_2O$ plus $K_2O$. French Patent Application 2662687 describe mineral fibers which decompose in the presence of a physiological medium, which contain silica, alumina, calcia, magnesia, $P_2O_5$, iron oxide and $Na_2O$ plus $K_2O$ plus $TiO_2$.

U.S. Pat. No. 4,604,097 describes a bioabsorbable glass fiber comprising generally a binary mixture of calcia and phosphorous pentoxide, but having other constituents such as calcium fluoride, water, and one or more oxides such as magnesia, zinc oxide, strontium oxide, sodium oxide, potassium oxide, lithium oxide or aluminum oxide.

International Publication WO 92/07801 describes a bioabsorbable glass fiber comprising phosphorous pentoxide, and iron oxide. A portion of the $P_2O_5$ may be replaced by silica, and a portion of the iron oxide may be replaced by alumina. Optionally the fiber contains a divalent cation compound selected from Ca, Zn and/or Mg, and an alkali metal cation compound selected from Na, K, and/or Li.

U.S. Pat. No. 5,055,428 describes a soda lime aluminoboro-silicate glass fiber composition which is soluble in a synthetic lung solution. Alumina content is decreased with an increase in boria, and an adjustment in silica, calcia, magnesia, $K_2O$ and optionally $Na_2O$. Other components may include iron oxide, titania, fluorine, barium oxide and zinc oxide.

International Publication WO 87/05007 describes inorganic fiber having solubility in saline solution and including silica, calcia, magnesia, and optionally alumina. International Publication WO 87/05007 discloses that the fiber composition preferably includes 55–64 weight percent silica. Moreover, none of the exemplary fiber compositions disclosed in WO 87/05007 include greater than 62.7 weight percent silica.

International Publication WO 89/12032 describes inorganic fiber having extractable silicon in physiological saline solution and including silica, calcia, optionally magnesia, alkali metal oxides, and one or more of alumina, zirconia, titania, boria and iron oxides. International Publication WO 89/12032 discloses that the fiber composition preferably includes 35–70 weight percent silica. None of the exemplary fiber compositions disclosed in International Publication WO 89/12032 include greater than 68.01 weight percent silica. The overall objective of both WO 87/05007 and WO 89/12032 was to provide a fiber composition useful as a substitute for traditional mineral wool fibers.

International Publication WO 93/15028 describes vitreous fibers that are saline soluble which in one usage crystallize to diopside upon exposure to 1000° C. and/or 800° C. for 24 hours and have the composition described in weight percent of silica 59–64, alumina 0–3.5, calcia 19–23 and magnesia 14–17, and which in another usage crystallize to wollastonite/pseudowollastonite and have the composition described in weight percent of silica 60–67, alumina 0–3.5, calcia 26–35 and magnesia 4–6. International Publication WO 93/15028 discloses that fiber compositions having a silica content greater than 70 weight percent fiberized poorly.

The fibers described in the above identified patent publications are limited, however, in their use temperature, and are therefore unsuitable for high temperature insulation applications, such as furnace linings for use above 1000° C., and reinforcement applications such as metal matrix composites and friction applications.

International Application WO 94/15883 discloses CaO/MgO/$SiO_2$ fibers with additional constituents $Al_2O_3$, $ZrO_2$, and $TiO_2$, for which saline solubility and refractoriness were investigated. That document states that saline solubility appeared to increase with increasing amounts of MgO, whereas $ZrO_2$ and $Al_2O_3$ were detrimental to solubility. The presence of $TiO_2$ (0.71–0.74 mol %) and $Al_2O_3$ (0.51–0.55 mol %) led to the fibers failing the shrinkage criterion of 3.5% or less at 1260° C. The document further states that fibers that are too high in $SiO_2$ are difficult or impossible to form, and cites samples having 70.04, 73.09, 73.28 and 78.07% $SiO_2$ as examples which could not be fiberized.

There is no clear teaching in either WO 93/15028 or WO 94/15883 that fiber melt compositions having greater than 71.24 weight percent silica are fiberizable. The poorly fiberized fibers manufactured according to the teachings of WO 93/15028 or WO 94/15883, do not possess adequate shrinkage and/or solubility properties and, therefore, would not be suitable for use as high temperature resistant insulation.

In addition to temperature resistance as expressed by shrinkage characteristics that are important in fibers that are used in insulation, it is also required that the fibers have mechanical strength characteristics during and following exposure to the use or service temperature, that will permit the fiber to maintain its structural integrity and insulating characteristics in use.

One characteristic of the mechanical integrity of a fiber is its after service friability. The more friable a fiber, that is, the more easily it is crushed or crumbled to a powder, the less mechanical integrity it possesses. We have observed that, in general, inorganic fibers that exhibit both high temperature resistance and non-durability in physiological fluids also exhibit a high degree of after service friability. This results in the fiber's lacking the strength or mechanical integrity after exposure to the service temperature, to be able to provide the necessary structure to accomplish its insulating purpose.

We have found high temperature resistant, non-durable fibers that do exhibit good mechanical integrity, including after service temperature exposure compression strength and compression recovery, according to tests that were performed on them.

Inorganic fiber compositions which may exhibit target durability, shrinkage at temperature, and strength characteristics may not, however, be susceptible to fiberization, either by spinning or blowing from a melt of its components.

U.S. Pat. No. 5,874,375 to Unifrax Corporation, the assignee of the present application, discloses particular inorganic fibers comprising the products of a substantially silica and magnesia fiberizable melt, that are soluble in physiological fluid and have good mechanical characteristics at a high use temperature limit.

A product based on non-durable fiber chemistry has been marketed by Unifrax Corporation (Niagara Falls, N.Y.) under the trademark INSULFRAX, having the nominal weight percent composition of 65% $SiO_2$, 31.1% CaO, 3.2% MgO, 0.3% $Al_2O_3$ and 0.3% $Fe_2O_3$. Another product is sold by Thermal Ceramics (located in Augusta, Ga.) under the trademark SUPERWOOL, and is composed of 58.5% $SiO_2$, 35.4% CaO, 4.1% MgO and 0.7% $Al_2O_3$ by weight. This material has a use limit of 1000° C. and melts at approximately 1280° C., which is too low to be desirable for the high temperature insulation purposes described above.

It is desirable to produce a readily manufacturable inorganic vitreous fiber from a fiberizable melt comprising high silica content and calcia that exhibit low shrinkage, low brittleness, superior mechanical strength, such as demonstrated by compression strength and recovery from compression after exposure to service temperatures of 1260° C. or higher.

It is desirable according to the present invention to provide high temperature resistant inorganic vitreous fiber, that is readily manufacturable from a melt having a viscosity suitable for blowing or spinning fiber, and which is non-durable in physiological fluids.

It is further desirable according to the present invention to provide high temperature resistant inorganic vitreous fiber, which is non-durable in physiological fluids, and which exhibits high compression strength and recovery from compression after exposure to service temperature.

It is also desirable according to the present invention to provide a high temperature resistant inorganic vitreous fiber, which is non-durable in physiological fluids, and which exhibits low shrinkage at the use temperature.

SUMMARY OF INVENTION

The present invention is directed to high temperature resistant inorganic fiber, useful as a heat or sound insulating material, which has a use temperature limit of at least up to 1330° C. More particularly, the present invention is directed to high temperature resistant fiber that is easily manufacturable, and which exhibits low shrinkage and retains good mechanical strength after exposure to the service temperature, yet which is non-durable in physiological fluids.

High temperature resistant inorganic vitreous fibers are provided which are non-durable in physiological fluids. The fibers exhibit a temperature use limit of up to 1330° C., or greater. At these high temperatures, fibers of the present invention as described below undergo less than about 20% linear shrinkage when held at the temperature for 24 hours. Shrinkage resistance is excellent at service temperatures up to 1260° C. with the fibers exhibiting less than about 5% shrinkage when held at 1260° C. for 24 hours. The fibers of the present invention are non-brittle and retain mechanical strength as shown by testing after exposure to service temperatures of 1260° C.

The non-durable inorganic vitreous fiber of the present invention comprises the fiberization product of greater than 71.25 weight percent silica, 0 to about 20 weight percent magnesia, about 5 to about 28.75 weight percent calcia, 0 to about 5 weight percent zirconia, and optionally, an effective amount of a viscosity modifier. The viscosity modifier may be selected from alumina, boria, and mixtures thereof. Other elements or compounds may be utilized as viscosity modifiers which, when added to the melt, affect the melt viscosity so as to approximate the profile, or shape, of the viscosity/temperature curve of a melt that is readily fiberizable, as discussed below. The fiber preferably contains not more than about 3.5 weight percent alumina, preferably the fiber contains up to about 2.5 weight percent alumina, more preferably the fiber contains up to about 1.5 weight percent alumina. In another embodiment, the fiber preferably contains not more than about 3.5 weight percent alumina, and not more than about 1.5 weight percent iron oxides (calculated as $Fe_2O_3$). In a further embodiment, the fiber contains up to about 1.5 weight percent alumina and not more than about 1.5 weight percent iron oxides (calculated as $Fe_2O_3$).

In another embodiment, the non-durable inorganic vitreous fiber of the present invention comprises the fiberization product of about 71.25 to about 85 weight percent silica, 0 to about 20 weight percent magnesia, about 5 to about 28.75 weight percent calcia, 0 to about 5 weight percent zirconia, and optionally, an effective amount of a viscosity modifier. The viscosity modifier may be selected from alumina, boria, and mixtures thereof. Other elements or compounds may be utilized as viscosity modifiers which, when added to the melt, affect the melt viscosity so as to approximate the profile, or shape, of the viscosity/temperature curve of a melt that is readily fiberizable, as discussed below, without adversely affecting fiber properties. The fiber preferably contains up to about 3.5 weight percent alumina. In certain embodiments, the fiber contains up to about 2.5 weight percent alumina, more preferably the fiber contains up to about 1.5 weight percent alumina. In another embodiment, the fiber preferably contains not more than about 3.5 weight percent alumina, and not more than about 1.5 weight percent iron oxides (calculated as $Fe_2O_3$). In a further embodiment, the fiber preferably contains up to about 1.5 weight percent alumina and not more than about 1.5 weight percent iron oxides (calculated as $Fe_2O_3$).

In another embodiment, the present invention further provides a high temperature resistant, non-durable inorganic vitreous fiber that maintains mechanical integrity after exposure to the service temperature, comprising the fiberization product of about 71.5 to about 79 weight percent silica, 0 to about 16.5 weight percent magnesia, about 9 to about 27 weight percent calcia, and 0 to about 4.6 weight percent zirconia. The fiber optionally contains about 0.10 to not more than about 3.5 weight percent alumina, and 0 to about 1.15 weight percent iron oxides, calculated as $Fe_2O_3$.

In a preferred embodiment, the present invention further provides a high temperature resistant, non-durable inorganic fiber which maintains mechanical integrity after exposure to the service temperature, comprising the fiberization product of about 71.5 to about 76.1 weight percent silica, 0 to about 16.5 weight percent magnesia, about 9.25 to about 28 weight percent calcia, and 0 to 4.6 weight percent zirconia.

The present invention provides a process for the production of low shrinkage, high temperature resistant inorganic fiber having a use temperature up to at least 1330° C., which maintains mechanical integrity after exposure to the use temperature and which is non-durable in physiological fluids, including forming a melt with ingredients comprising greater than 71.25 weight percent silica, 0 to about 20 weight percent magnesia, about 5 to about 28.75 weight percent calcia, 0 to about 5 weight percent zirconia, and optionally a viscosity modifier in an amount effective to render the product fiberizable; optionally up to about 3.5% alumina, preferably up to about 2.5 weight percent alumina, more preferably up to about 1.5 weight percent alumina, and up to about 1.5 wt/% $Fe_2O_3$; and producing fibers from the melt. In a further embodiment, the fiber preferably contains up to about 1.5 weight percent alumina and not more than about 1.5 weight percent iron oxides (calculated as $Fe_2O_3$).

In another embodiment, the process for the production of low shrinkage, high temperature resistant inorganic fiber having a use temperature up to at least 1330° C., which maintains mechanical integrity after exposure to the use temperature and which is non-durable in physiological fluids comprises forming a melt with ingredients comprising 71.25 to about 85 weight percent silica, 0 to about 20 weight percent magnesia, about 5 to about 28.75 weight percent calcia, 0 to about 5 weight percent zirconia, and optionally, an effective amount of a viscosity modifier. The viscosity modifier may be selected from alumina, boria, and mixtures thereof. Other elements or compounds may be utilized as viscosity modifiers which, when added to the melt, affect the melt viscosity so as to approximate the profile, or shape, of the viscosity/temperature curve of a melt that is readily fiberizable, as discussed below. The fiber preferably contains up to about 3.5 weight percent alumina, preferably the fiber contains up to about 2.5 weight percent alumina, more preferably the fiber contains up to about 1.5 weight percent alumina. In another embodiment, the fiber preferably contains up to about 3.5 weight percent alumina, and up to about 1.5 weight percent iron oxides (calculated as $Fe_2O_3$). In a further embodiment, the fiber preferably contains up to about 1.5 weight percent alumina and not more than about 1.5 weight percent iron oxides (calculated as $Fe_2O_3$).

In one embodiment, the process for the production of low shrinkage, high temperature resistant inorganic fiber having a use temperature up to at least 1330° C., which maintains mechanical integrity after exposure to the use temperature and which is non-durable in physiological fluids, including forming a melt with ingredients comprising about 71.5 to about 79 weight percent silica, 0 to about 16.5 weight percent magnesia, about 9 to about 27 weight percent calcia, and, optionally, 0 to about 4.6 weight percent zirconia.

In preferred embodiment, the process for the production of low shrinkage, high temperature resistant inorganic fiber having a use temperature up to at least 1330° C., which maintains mechanical integrity after exposure to the use temperature and which is non-durable in physiological fluids, including forming a melt with ingredients comprising 71.5 to about 76.1 weight percent silica, 0 to about 16.5 weight percent magnesia, about 9.25 to about 28 weight percent calcia and 0 to about 4.6 weight percent zirconia.

The melt compositions utilized to produce the fibers of the present invention provide a melt viscosity suitable for blowing or spinning fiber, and for imparting mechanical strength to the resultant fibers after exposure to service temperature.

The present invention further provides a high temperature resistant fiber containing article selected from the group consisting of bulk fiber, blankets, needled blankets, papers, felts, cast shapes, vacuum cast forms, and compositions, said article comprising the inventive low shrinkage, high temperature resistant inorganic fiber.

The present invention further provides a method of insulating an article, including disposing on, in, near or around the article, a thermal insulation material having a service temperature up to at least 1330° C., which maintains mechanical integrity after exposure to the use temperature and which is non-durable in physiological fluids, said insulation material comprising the fiber of any of the above described embodiments.

DETAILED DESCRIPTION OF THE INVENTION

According to the present invention, there is provided inorganic fiber useful as a heat or sound insulation material, which has a temperature use limit up to at least 1330° C. and which is non-durable in physiological fluids, such as lung fluid. By non-durable in physiological fluids is meant that the fiber at least partially dissolves in such fluids (such as simulated lung fluid) during in vitro tests.

In order for a inorganic composition to be a viable candidate for producing a satisfactory high temperature inorganic fiber product, the fiber to be produced must be manfacturable, sufficiently soluble in physiological fluids, and capable of surviving high temperatures with minimal shrinkage and minimal loss of integrity. To identify materials that meet these criteria, a set of screening tests were used to identify fibers that exhibit the target properties. These tests include (a) viscosity/fiberization (b) durability, (c) shrinkage at temperature and (d) after-service friability, strength and resilience.

"Viscosity" refers to the ability of a glass melt to resist flow or shear stress. The viscosity-temperature relationship is critical in determining whether it is possible to fiberize a given glass composition. An optimum viscosity curve would have a low viscosity (5–50 poise) at the fiberization temperature and would gradually increase as the temperature decreased. If the melt is not sufficiently viscous (i.e., too thin) at the fiberization temperature, the result is a short, thin fiber, with a high proportion of unfiberized material (shot). If the melt is too viscous at the fiberization temperature, the resulting fiber will be extremely coarse (high diameter) and short.

Viscosity-temperature profiles may be measured on a viscometer, capable of operating at elevated temperatures. In addition, an adequate viscosity profile may be inferred by routine experimentation, examining the quality of fiber (index, diameter, length) produced.

The durability test measures the rate at which mass is lost from the fiber ($ng/cm^2$-hr) under conditions which simulate the temperature and chemical conditions found in the human lung. This test consists of exposing approximately 0.1 g of de-shotted fiber to a 0.3 ml/min flow of simulated lung fluid (SLF). The entire test system is maintained at 37° C., to simulate the temperature of the human body. Tests preferably last for between about two and four weeks.

After the SLF has flowed through the fiber, it is collected and analyzed for glass constituents using Inductively Coupled Plasma Spectroscopy. A "blank" SLF sample is also measured and used to correct for elements present in the SLF. Once this data has been obtained, it is possible to calculate the rate at which the fiber has lost mass over the time interval of the study.

Fibers are tested for shrinkage by wet-forming them into a pad, measuring by means of calipers the pad's length and width dimensions (typically 3×5 inches), placing the pad into a furnace, ramping to temperature and holding for a fixed period of time. After heating, the pads are re-measured to determine any changes in dimension, which have occurred.

In one such test, pads were made by mixing about 427 grams fiber, 27.2 grams of phenolic binder and about 4 gallons of water, pouring the mixture into a sheet mold and allowing the water to drain through the bottom of the mold. The pad was dried and a piece measuring 3 inches by 5 inches by 1 inch was cut. The length and width of this piece were carefully measured, and the pad was placed in a furnace and brought to a service temperature of 1150° C., 1260° C. or 1330° C. for 24 hours. After cooling, the lateral dimensions were measured and the linear shrinkage was determined by comparing "before" and "after" measurements. If the fiber is available in blanket form, measurements may be made directly on the blanket without the need to form a pad. (Such blanket shrinkage measurements correlate to, but are not identical to, pad shrinkage measurements.)

After-service friability refers to the ability of fiber to retain its mechanical integrity after exposure to high temperatures. This is an important property, since fiber must support its own weight in any application and must also be able to resist abrasion due to moving air or gas. Indications of fiber integrity and mechanical strength are provided by visual and tactile observations, as well as mechanical measurement of these properties of after-service temperature exposed fibers.

Shrinkage pads' after-service integrity is indicated by two tests: compression strength and compression recovery. These tests measure, respectively, how easily the pad may be deformed and the amount of resiliency (or compression recovery) the pad exhibits after a compression of 50%.

Shrinkage pads prepared from fibers of the present invention were heated at a tested service temperature, such as 1150° C. and 1260° C. for 24 hours, and were then compression tested using an Instron testing device. A 2.5 inch diameter cylindrical ram was pushed into the shrinkage pad until the pad was compressed to half its original thickness. At this point, the crosshead was stopped and the peak load (in psi) encountered during compression was recorded.

Compression recovery was then measured by slowly reversing the travel direction of the crosshead and backing the cylindrical ram out of the shrinkage pad until the load reading was zero. The distance of travel from the 50% compression point to the zero load point was recorded and expressed as a percentage of original pad thickness. This number is indicative of the amount of resiliency of the fiber pad.

By this testing criteria, a poorly performing pad would have low values for compressive strength indicating that it is easily compressed, and low values for compression recovery indicating that once deformed the pad experiences little recovery. Conversely, a pad/fiber composition with high values for these parameters exhibits high mechanical strength and is considered a good-performer. An ideal fiber would have a compressive strength within a target range comparable to a standard, commercial aluminosilicate fiber, and additionally having high compression recovery, or resiliency.

The present invention provides for a process for the production of high temperature resistant vitreous inorganic fiber having low shrinkage at a use temperature up to at least 1330° C., which maintains mechanical integrity after exposure to the use temperature and which is non-durable in physiological fluids, comprising forming a melt with ingredients comprising greater than 71.25 weight percent silica, 0 to about 20 weight percent magnesia, about 5 to about 28.75 weight percent calcia, 0 to about 5 weight percent zirconia, and optionally and a viscosity modifier in an amount effective to render the product fiberizable and producing fibers from the melt. The fiber preferably contains up to about 3.5 weight percent alumina. In certain embodiments, the fiber contains up to about 2.5 weight percent alumina and, preferably, up to about 1.5 weight percent alumina. In another embodiment, the fiber contains not more than about 1.5 weight percent iron oxides (calculated $Fe_2O_3$) and not more than about 3.5 weight percent alumina. In a further embodiment, the fiber optionally contains up to about 1.5 weight percent alumina and not more than about 1.5 weight percent iron oxides (calculated $Fe_2O_3$).

The non-durable inorganic fibers according to the present invention are made by standard manufacturing methods. Raw materials, such as silica, and any suitable source of calcium and magnesium such as enstatite, forsterite, magnesia, magnesite, calcined magnesite, magnesium zirconate, periclase, steatite, talc, olivine, calcite, lime, limestone, calcined limestone, wollastonite, dolomite, or dolomitic quicklime, are delivered in the selected proportions from bins to the furnace where they are melted and blown using a fiberization nozzle, or spun, either in a batch or a continuous mode.

The non-durable vitreous inorganic fibers according to the present invention are made by standard manufacturing methods. The raw materials, which generally comprise greater than 71.25 weight percent silica, 0 to about 20 weight percent magnesia, about 5 to about 28.5 weight percent calcia, optionally zirconia, and optionally a viscosity modifier in an amount effective to render the product fiberizable, are delivered to the melt as discussed above for blowing or spinning.

The viscosity of the melt may optionally be controlled by the presence of viscosity modifiers, sufficient to provide the fiberization required for the desired applications. The viscosity modifiers may be present in the raw materials which supply the main components of the melt, or may, at least in part, be separately added. Desired particle size of the raw materials is determined by furnacing conditions, including furnace size (SEF), pour rate, melt temperature, residence time, and the like.

According to one embodiment of the present invention, the inorganic fiber is capable of withstanding a use temperature of at least up to 1330° C. with less than about 20% linear shrinkage, exhibits low after service friability, and is non-durable in physiological fluids, such as lung fluid. The non-durable refractory inorganic fiber of the present invention comprises the fiberization product of greater than 71.25 weight percent silica, 0 to about 20 weight percent magnesia, about 5 to about 28.5 weight percent calcia, and optionally a viscosity modifier in an amount effective to render the product fiberizable. The fiber preferably contains up to about 3.5 weight percent alumina, more preferably up to about 2.5 weight percent alumina, most preferably up to about 1.75 weight percent alumina; and not more than about 1.5 weight percent iron oxides (calculated as $Fe_2O_3$), more preferably not more than about 1.15 weight percent iron oxides. The viscosity modifier may be selected from alumina, boria, and mixtures thereof. Other elements or compounds may be utilized as viscosity modifiers which, when added to the melt, affect the melt viscosity so as to approximate the profile, or shape, of the viscosity/ temperature curve of a melt that is readily fiberizable, without having a detrimental affect on the fiber properties.

In preferred ranges, the non-durable refractory glass fiber comprises the fiberization product of about 71.5 to about 79 weight percent silica, 0 to about 16.5 weight percent magnesia, about 9 to about 27 weight percent calcia, and 0 to about 4.6 weight percent zirconia; 71.5 to about 76.1 weight percent silica, 0 to about 16.5 weight percent magnesia, and about 9.25 to about 28 weight percent calcia; and 72 to about 75 weight percent silica, 0 to about 16.5 weight percent magnesia, about 9.25 to about 28 weight percent calcia, and 0 to about 4.6 weight percent zirconia. Zirconia may optionally be present in up to about 5 weight percent, more preferably up to about 4.6 weight percent. Listed in Table I below are examples of compositions of the present invention that have target shrinkage and mechanical strength characteristics for a service temperature of at least 1330° C., and that among others, are suitable to be fiberized from melts.

In the melt and fibers of the present invention, the operable silica level is greater than 71.25 weight percent, preferably greater than 71.25 to about 85 weight percent silica, more preferably from greater than about 71.5 to about 79 weight percent silica, more preferably from about 72 to about 79 weight percent silica, and most preferably from about 72 to about 75 weight percent silica, with the upper level of silica limited only by manufacturability. This is contrary to the teachings in the art, which state that fibers having silica levels above 71.24 weight percent are not manufacturable.

The fibers of the present invention preferably contain substantially no alkali metal, greater than trace impurities. The alkali metal content of these fibers is generally in the range of trace impurities, or hundredths of a percent at most, calculated as alkali metal oxide.

Further specific embodiments of the fiber composition comprise the fiberization product of about 72 to about 79 weight percent silica, 0 to about 1 weight percent magnesia, about 18 to about 27 weight percent calcia, and 0 to about 4.6 weight percent zirconia; the fiberization product of about 72 to about 75 weight percent silica, about 8 to about 12.5 weight percent magnesia and about 12.5 to about 18 weight percent calcia; and the fiberization product of about 72.5 to about 73 weight percent silica, about 3 to about 4 weight percent magnesia and about 22 to about 23 weight percent calcia.

The inventive vitreous inorganic fiber compositions listed in Table I were produced by blowing techniques and as noted above, were tested for linear shrinkage at temperatures of 1330° C. and after-service friability. The results of these tests are listed below in Table II. These same tests were also performed on a commercial magnesium silicate fiber and two different commercial calcium silicate fibers, all of which were produced using spinning techniques. The latter compositions are labeled as comparative compositions 3–4 and their compositions are also set forth in Table I. The test results of the comparative fibers are also shown in Table II.

TABLE I

| Composition | 1 weight % | 2 weight % | Comparative 3 | Comparative 4 | Comparative 5 |
|---|---|---|---|---|---|
| $SiO_2$ | 72.57 | 72.64 | 76.46 | 65.36 | 66.9 |
| MgO | 3.21 | 3.18 | 20.87 | 14.34 | 3.7 |
| CaO | 22.4 | 22.23 | 0 | 18.82 | 28.20 |
| $Fe_2O_3$ | 1.05 | 1.15 | 0.320 | 0 | 0 |
| $Al_2O_3$ | 0.14 | 0.15 | 1.59 | 1.14 | 0.54 |

EXAMPLE 1

Composition 1 is a fiber blown from a melt comprising about 72.57 weight percent $SiO_2$, about 22.4 weight percent CaO, and about 3.21 weight percent MgO. The diameter of the blown fiber was 1.56 μm.

EXAMPLE 2

Composition 2 is a fiber blown from a melt comprising about 72.64 weight percent $SiO_2$, about 22.23 weight percent CaO, and about 3.18 weight percent MgO. The diameter of the blown fiber was 1.27 μm.

EXAMPLE 3

Comparative Composition 3 was a commercial magnesia silicate fiber spun from a melt comprising 76.46 weight percent silica and 20.87 weight percent magnesia having a diameter of 4.5 μm. Comparative composition 3 demonstrated 11% linear shrinkage after being exposed to temperatures of 1330° C. The inventive calcium magnesia silicate fibers approach this desirable performance, with the advantage of being capable of being produced more economically.

EXAMPLE 4

Comparative Composition 4 was a commercial calcium silicate composition spun from a melt comprising of 65.36 weight percent $SiO_2$, 14.34 weight percent MgO and 18.82 weight percent CaO, having a diameter of 4.8 μm. The fiber has a higher linear shrinkage rate at 1330° C. and is more brittle than the inventive calcium silicate fiber after exposure to service temperatures of 1260° C.

EXAMPLE 5

Comparative Composition 5 was a commercial calcium silicate composition formed by spinning from a melt comprising of 66.9 weight percent $SiO_2$, 3.7 weight percent MgO and 28.2 weight percent CaO and had a diameter of 4.3 μm. The comparative composition also has a higher linear shrinkage than the inventive calcium silicate fiber rate at service temperatures of 1260° C. and is more brittle than the inventive fiber after exposure to temperatures of 1260° C.

TABLE II

| Composition | LINEAR SHRINKAGE (24 HRS) | | | 50% Recovery Compression | |
|---|---|---|---|---|---|
| | 1150° C. % | 1260° C. % | 1330° C. % | 1150° C. % | 1260° C. % |
| 1 | 0.8 | 4.5 | 15 | 22.6 | 6.4 |
| 2 | 0.9 | 4.8 | * | 23.9 | 7.1 |
| Comparative 3 | 1.7 | 4.6 | 11 | 23.8 | 17.0 |
| Comparative 4 | | 3.7 | 28 | | 2.8 |
| Comparative 5 | 0.2 | 8.6 | 39.2 | 13.9 | 1.4 |

*Not tested.

As seen from the data above, the vitreous inorganic fibers of the present invention are less brittle after exposure to service temperatures of 1260° C. and demonstrate less linear shrinkage at temperatures of 1330° C. than the comparative commercial calcium silicate compositions 4 and 5. Additionally, they possess greater mechanical strength than the commercial calcium silicate fibers.

Viscosity vs. Temperature

The shape of the viscosity vs. temperature curve for a glass composition is representative of the ease with which a melt will fiberize and thus, of the quality of the resulting fiber (affecting, for example, the fiber's shot content, fiber diameter, and fiber length). Glasses generally have low viscosity at high temperatures. As temperature decreases, the viscosity increases. The value of the viscosity at a given temperature will vary as a function of composition, as will the overall steepness of the viscosity vs. temperature curve.

Figure 1A:
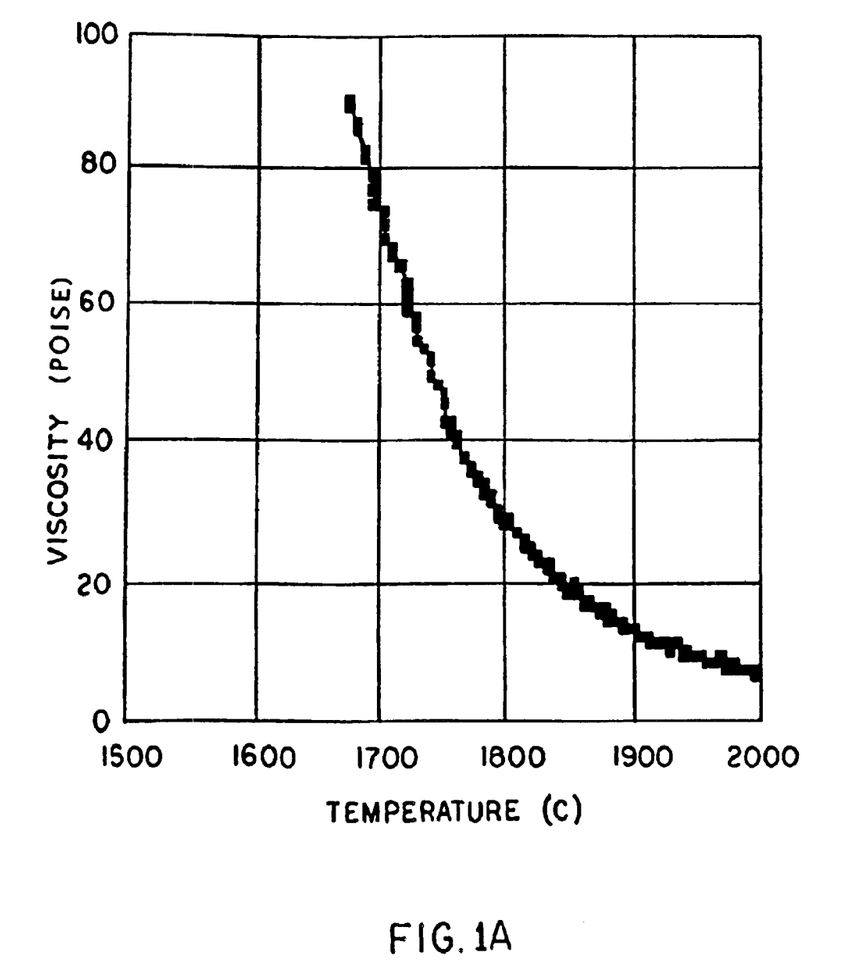
FIG. 1A is a viscosity vs. temperature curve of a melt chemistry for a commercially available, spun aluminosilicate fiber.
Figure 1B:
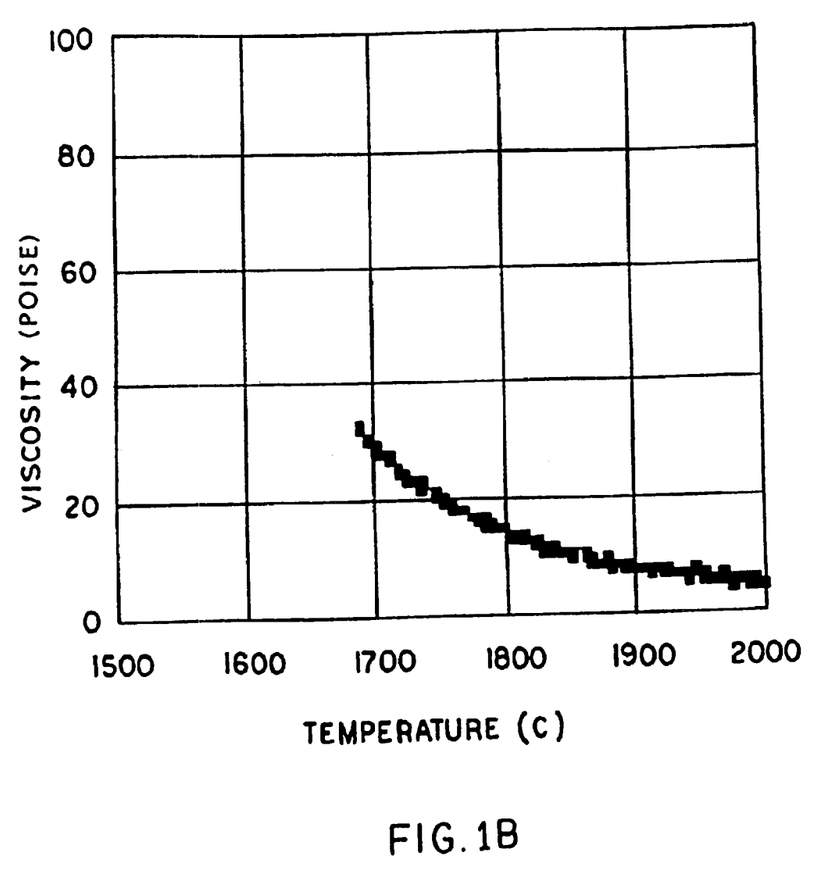
FIG. 1B is a viscosity vs. temperature curve of a melt chemistry for a commercially available, blown aluminosilicate fiber.

One approach to testing whether a fiber of a defined composition can be readily manufactured at an acceptable quality level is to determine whether the viscosity curve of the experimental chemistry matches that of a known product which can be easily fiberized. Such a target viscosity curve is shown in FIG. 1A, being the viscosity curve for a commercially available spun aluminosilicate fiber, and in FIG. 1B, being the viscosity curve for a commercially available blown aluminosilicate fiber.

Figure 2:
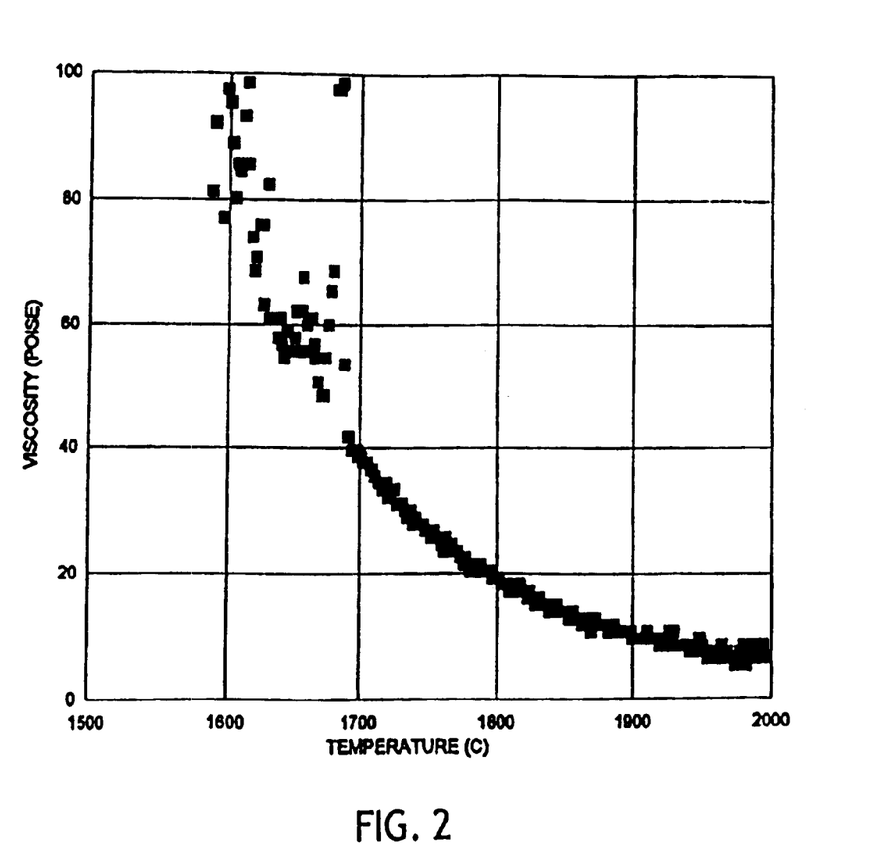
FIG. 2 is a viscosity vs. temperature curve for a calcia-magnesia-silica fiber melt chemistry having 73.5% by weight silica.
Figure 3:
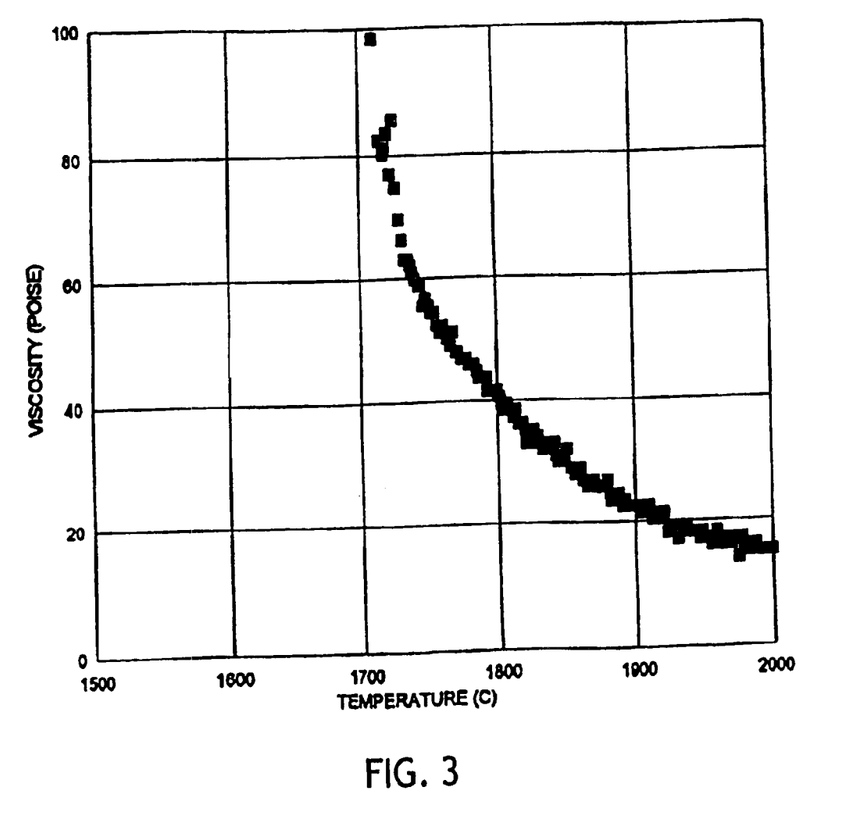
FIG. 3 is a viscosity vs. temperature curve for a calcia-magnesia-silica-zirconia fiber melt chemistry having 75% by weight silica

FIG. 2 shows the viscosity curve for a calcia-magnesia-zirconia-silica fiber melt chemistry comprising 75 percent silica, 8 percent magnesia, 15 percent calcia and 2 percent zirconia, by weight. This curve approximates the target viscosity curve of FIG. 1A for the commercially available, spun aluminosilicate fiber. FIG. 3 shows the viscosity curve for a calcia-magnesia-silica fiber melt chemistry comprising 73.5 percent silica, 13.5 percent magnesia, and 13.5 percent calcia, by weight. This curve approximates the target viscosity curve of FIG. 1B for the commercially available, blown aluminosilicate fiber. These fiber melt chemistries, according to the present invention, are well suited to fiberization by conventional blowing or spinning techniques.

Further examples of the inventive vitreous inorganic fiber compositions listed in Table III below were produced and various samples were tested for linear shrinkage at temperatures of 1150° C., 1260° C., and 1330° C. as well as compression recovery and solubility in a physiological solution. The results of these tests are listed below in Table IV. The fibers of Composition 6 had an average diameter of about 2.37 microns and the fibers of Composition 7 had an average diameter of about 2.42 microns.

TABLE III

| Composition | $SiO_2$ wt % | MgO wt % | CaO wt % | $Fe_2O_3$ wt % | $ZrO_2$ wt % | $Al_2O_3$ wt % |
|---|---|---|---|---|---|---|
| 6 | 75 | 8.4 | 13.61 | 0.15 | | 1.64 |
| 7 | 72.1 | 9.64 | 15.3 | 0.14 | | 2.34 |
| 8 | 73.5 | 12.5 | 12.5 | | | 1.5 |
| 9 | 74.06 | 9.83 | 11.87 | 0.19 | | 3.47 |
| 10 | 72.4 | 11.1 | 14.9 | | | 1.65 |
| 11 | 78.7 | 0.2 | 20.2 | | 0 | 0.67 |
| 12 | 72.4 | 0 | 26.5 | | 0 | 0.87 |
| 13 | 72.4 | 0 | 26.6 | | 0 | 0.64 |
| 14 | 76.1 | 0 | 18.7 | | 4.6 | 0.51 |
| 15 | 73 | 0 | 26.4 | | 0 | 0.3 |
| 16 | 78.2 | 0 | 18.9 | | 2.4 | 0.3 |
| 17 | 73.2 | 11.9 | 13.1 | | 0 | 1.7 |
| 18 | 71.8 | 0 | 21.2 | | 4.5 | 2.3 |
| 19 | 72.4 | 16.1 | 9.35 | 0.25 | | 1.61 |
| C20 | 67.6 | 4.5 | 26.3 | 0.44 | | 0.71 |
| C21 | 70.9 | 4.45 | 23.2 | 0.4 | | 0.6 |
| C22 | 67.5 | 30.26 | 0.3 | | 0 | 1.9 |
| C23 | 67.5 | 30.6 | 0.3 | | 0.6 | 0.92 |

These same tests were also performed on two different calcium silicate fibers and two different magnesium silicate fibers. The latter compositions are labeled as comparative compositions C20–C23 and their compositions are also set forth in Table III. The shrinkage test results of the comparative fibers are also shown in Table IV.

TABLE IV

| Comp. | 1150° C. % shrinkage[1] | 1260° C. % shrinkage[1] | 1330° C. % shrinkage[1] | 1150% compr rec | 1260% compr rec | Dissolution Rate ng/cm2-hr |
|---|---|---|---|---|---|---|
| 6 | 1.4 | 2.5 | 9.3 | 27.2 | 14 | |
| 7 | 1.9 | 3.1 | 19 | 23 | 18.4 | |
| 8 | 2.3 | 3.5 | | 21.7 | 16.3 | |
| 9 | 1.3 | 5.3 | | 22 | 8.9 | |
| 10 | 0.8 | 2.1 | 17.1 | | | |
| 11 | | 1.3 | | | 7.5 | 211 |
| 12 | | 1.5 | | | 5.3 | 181 |
| 13 | | 1.4 | | | 5.3 | 130 |
| 14 | | 1.1 | | | 3.6 | 54 |
| 15 | | 1.4 | | | 5.3 | 256 |
| 16 | | 0.9 | | | 3.8 | 148 |
| 17 | | 4.9 | | | 12.7 | 491 |
| 18 | | 0.7 | | | 4.1 | 57 |
| 19 | 2.7 | | | | | |
| C20 | | 8.4 | | | | |
| C21 | | 6.8 | | | | |
| C22 | | 7.7 | | | | |
| C23 | | 9.2 | | | | |

[1]Tests not conducted where shrinkage data is not provided.

The inventive fibers possess excellent shrinkage resistance, and mechanical strength as measured by compression recovery, after service temperatures of 1150° C., 1260° C., and 1330° C., and are soluble in physiological fluid, as measured in simulated lung fluid.

Analysis of the durability of the above fibers in simulated lung fluid indicates that these fibers are significantly less durable than normal refractory ceramic fiber, such as aluminosilicates (about 50/50 weight percent) and alumino-zirconia-silicates or AZS about 30/16/54 weight percent).

The tests on the inventive fiber have been conducted on fibers that have been produced using a blowing technique. The inventive fibers can also be produced using a spinning technique.

Table V below lists several illustrative additional examples of the fiber composition of the present invention.

TABLE V

| SiO2 weight % | MgO weight % | CaO weight % |
|---|---|---|
| 71.25 | 1.75–10.75 | 18–27 |
| 71.5 | 7.15–10.65 | 17.85–21.35 |
| 78.5 | 5.38–8.05 | 13.45–16.12 |

It has, therefore, been demonstrated that a fiber composition comprising the fiberization product of greater than 71.25 silica, preferably in the range of about 71.5 to about 79 weight percent silica, more preferably in the range of about 72 to about 79 weight percent silica, more preferably in the range of about 72 to about 75 weight percent silica, and containing calcia, optionally magnesia, optionally zirconia, and optionally a viscosity modifier, is readily fiberizable into a high temperature resistant insulating fiber. This is contrary to the teachings of the prior art, which teaches that melt compositions having greater than 71.24 weight percent silica are very difficult, if not impossible, to be fiberized into a fiber.

It has also been demonstrated that the fiber composition of the present invention containing the fiberization product of greater than 71.25 silica, preferably in the range of about 71.5 to about 79 weight percent silica, more preferably in the range of about 72 to about 79 weight percent silica, more preferably in the range of about 72 to about 75 weight percent silica, and containing calcia, optionally magnesia, optionally zirconia, and optionally a viscosity modifier possesses acceptable shrinkage characteristics not only at service temperatures of 1150° C. and 1260° C., but also at service temperatures of 1330° C. This surprising and unexpected feature of low shrinkage at a service temperature of 1330° C. has not been disclosed or suggested by the prior art relating to fiber compositions containing silica, calcia and optionally magnesia. Additionally, the fiber composition possesses excellent after service mechanical strength and is soluble in physiological fluids.

It should be appreciated that the present invention is not limited to the specific embodiments described above, but includes the following variations, modifications and equivalent embodiments. The embodiments disclosed separately are not necessarily in the alternative, as various embodiments of the invention may be combined to provide desired characteristics or results.

We claim:

1. A low shrinkage, high temperature resistant inorganic fiber having a maximum use temperature up to 1330° C. or greater, which maintains mechanical integrity after exposure to the use temperature and which is non-durable in physiological fluids, comprising the fiberization product of greater than 71.25 to about 85 weight percent silica, greater than 0 to about 20 weight percent magnesia, about 5 to about 28.75 weight percent calcia, 0 to about 5 weight percent zirconia, and optionally a viscosity modifier in an amount effective to render the product fiberizable, wherein the fiber contains substantially no alkali metal oxide greater than trace impurities.

2. The fiber of claim 1, wherein the fiber comprises the fiberization product of about 71.5 to about 79 weight percent silica, greater than 0 to about 16.5 weight percent magnesia, about 9 to about 27 weight percent calcia, and 0 to about 4.6 weight percent zirconia.

3. The fiber of claim 1 wherein the fiber comprises the fiberization product of about 71.5 to about 76.1 weight percent silica, about 9.25 to about 28 weight percent calcia, greater than 0 to about 16.5 weight percent magnesia, and 0 to about 4.6 zirconia.

4. The fiber of claim 1 wherein the fiber comprises the fiberization product of about 72 to about 75 weight percent silica, greater than 0 to about 16.5 weight percent magnesia and about 9.25 to about 28 weight percent calcia.

5. The fiber of claim 1 wherein the fiber comprises the fiberization product of about 72 to about 79 weight percent silica, greater than 0 to about 1 weight percent magnesia, about 18 to about 27 weight percent calcia, and 0 to about 4.6 weight percent zirconia.

6. The fiber of claim 1 wherein the fiber comprises the fiberization product of about 72 to about 75 weight percent silica, about 8 to about 12.5 weight percent magnesia, and about 12.5 to about 18 weight percent calcia.

7. The fiber of claim 1 wherein the fiber comprises the fiberization product of about 72.5 to about 73 weight percent silica, about 3 to about 4 weight percent magnesia, and about 22 to about 23 weight percent calcia.

8. The fiber of claim 1 wherein the fiber comprises the fiberization product of greater than about 71.25 weight percent silica, about 1.75 to about 10.75 weight percent magnesia, and about 18 to about 27 weight percent calcia.

9. The fiber of claim 1 wherein the fiber comprises the fiberization product of greater than about 71.5 weight percent silica, about 7.15 to about 10.65 weight percent magnesia, and about 17.85 to about 21.35 weight percent calcia.

10. The fiber of claim 1 wherein the fiber comprises the fiberization product of greater than about 78.5 weight percent silica, about 5.38 to about 8.05 weight percent magnesia, and about 13.45 to about 16.12 weight percent calcia.

11. The fiber of claim 1 containing up to about 1.5 weight percent iron oxide calculated as $Fe_2O_3$.

12. The fiber of claim 11, containing up to about 1.15 weight percent iron oxide calculated as $Fe_2O_3$.

13. The fiber of claim 1 containing up to about 3.5 weight percent alumina.

14. The fiber of claim 13 containing up to about 2.5 weight percent alumina.

15. The fiber of claim 13 containing up to about 1.5 weight percent alumina.

16. The fiber of claim 1 wherein said fiber exhibits a linear shrinkage of less than about 5% at 1260° C. for 24 hours.

17. The fiber of claim 1 wherein said fiber exhibits a linear shrinkage of about 20% or less at 1330° C. for 24 hours.

18. The fiber of claim 1 wherein said fiber demonstrates a recovery of at least about 5% after 50% compression following exposure to a service temperature of 1260° C.

19. A high temperature resistant fiber containing article selected from the group consisting of bulk fiber, blankets, needled blankets, papers, felts, cast shapes, vacuum cast forms, and compositions, said article comprising the fiber of any of claims 1 to 18.

20. A process for the production of low shrinkage, high temperature resistant fiber having a maximum use temperature up to 1330° C. or greater, which maintains mechanical integrity after exposure to the use temperature and which is non-durable in physiological fluids, including forming a melt with ingredients comprising greater than about 71.25 to about 85 weight percent silica, greater than 0 to about 20 weight percent magnesia, about 5 to about 28.75 weight percent calcia, 0 to about 5 weight percent zirconia, and optionally a viscosity modifier in an amount effective to render the product fiberizable; and wherein the melt contains substantially no alkali metal oxide greater than trace impurities; and producing fibers from the melt.

21. The process of claim 20 wherein the ingredients of the melt comprise about 71.5 to about 79 weight percent silica, greater than 0 to about 16.5 weight percent magnesia, about 9 to about 27 weight percent calcia, and 0 to about 4.6 weight percent zirconia.

22. The process of claim 20 wherein the ingredients of the melt comprise about 71.5 to about 76.1 weight percent silica, greater than 0 to about 16.5 weight percent magnesia, about 9.25 to about 28 weight percent calcia and 0 to about 4.6 weight percent zirconia.

23. The process of claim 20 wherein the ingredients of the melt comprise about 72 to about 75 weight percent silica, greater than 0 to about 16.5 weight percent magnesia and about 9.25 to about 28 weight percent calcia.

24. The process of claim 1 wherein the ingredients of the melt comprise about 72 to about 79 weight percent silica, greater than 0 to about 1 weight percent magnesia, about 18 to about 27 weight percent calcia, and 0 to about 4.6 weight percent zirconia.

25. The process of claim 20 wherein the ingredients of the melt comprise about 72 to about 75 weight percent silica, about 8 to about 12.5 weight percent magnesia, and about 12.5 to about 18 weight percent calcia.

26. The process of claim 20 wherein the ingredients of the melt comprise about 72.5 to about 73 weight percent silica, about 3 to about 4 weight percent magnesia, and about 22 to about 23 weight percent calcia.

27. The process of claim 20 wherein the ingredients of the melt comprise greater than about 71.25 weight percent silica, about 1.75 to about 10.75 weight percent magnesia, and about 18 to about 27 weight percent calcia.

28. The process of claim 20 wherein the ingredients of the melt comprise greater than about 71.5 weight percent silica, about 7.15 to about 10.65 weight percent magnesia, and about 17.85 to about 21.35 weight percent calcia.

29. The process of claim 20 wherein the ingredients of the melt comprise about 78.5 weight percent silica, about 5.38 to about 8.05 weight percent magnesia, and about 13.45 to about 16.12 weight percent calcia.

30. The process of claim 20 wherein the ingredients of the melt contain up to about 1.5 weight percent iron oxide calculated as $Fe_2O_3$.

31. The process of claim 20 wherein the ingredients of the melt contain up to about 1.15 weight percent iron oxide calculated as $Fe_2O_3$.

32. The process of claim 31 wherein the ingredients of the melt contain up to about 3.5 weight percent alumina.

33. The process of claim 32 wherein the ingredients of the melt contain up to about 2.5 weight percent alumina.

34. The process of claim 32 wherein the ingredients of the melt contain up to about 1.5 weight percent alumina.

35. The process of claim 20 including spinning the fibers from the melt.

36. The process of claim 20 including blowing the fibers from the melt.

37. A low shrinkage, high temperature resistant inorganic fiber having a maximum use temperature up to 1330° C. or greater, which maintains mechanical integrity after exposure to the use temperature and which is non-durable in physiological fluids prepared in accordance with any one of claims 20 to 36.

38. A method of insulating an article, including disposing on, in, near or around the article, a thermal insulation material having a maximum service temperature of 1330° C. or greater, said insulation material comprising the fiber of any one of claims 1 to 18.

39. The fiber of claim 1 comprising the fiberization product of greater than 71.25 to about 85 weight percent silica, greater than 10 to about 20 weight percent magnesia, about 5 to about 18.75 weight percent calcia, 0 to about 5 weight percent zirconia, and optionally a viscosity modifier in an amount effective to render the product fiberizable.

40. The fiber of claim 39 containing up to about 1.5 weight percent iron oxide calculated as $Fe_2O_3$.

41. The fiber of claim 39 containing up to about 3.5 weight percent alumina.

42. The fiber of claim 39 containing substantially no alkali metal oxide greater than trace impurities.

43. The fiber of claim 39 wherein said fiber exhibits a linear shrinkage of less than about 5% at 1260° C. for 24 hours.

44. The fiber of claim 39 wherein said fiber exhibits a linear shrinkage of about 20% or less at 1330° C. for 24 hours.

45. The fiber of claim 39 wherein said fiber demonstrates a recovery of at least about 5% after 50% compression following exposure to a service temperature of 1260° C.

46. A high temperature resistant fiber containing article selected from the group consisting of bulk fiber, blankets, needled blankets, papers, felts, cast shapes, vacuum cast forms, and compositions, said article comprising the fiber of claim 39.

47. A method of insulating an article, including disposing on, in, near or around the article, a thermal insulation material having a maximum service temperature of 1330° C. or greater, said insulation material comprising the fiber of claim 39.

48. The fiber of claim 1 comprising the fiberization product of greater than 71.25 to about 85 weight percent silica, greater than 0 to about 20 weight percent magnesia, greater than 5 to about 14 weight percent calcia, 0 to about 5 weight percent zirconia, substantially no alkali metal oxide greater than trace impurities, and optionally a viscosity modifier in an amount effective to render the product fiberizable.

49. The fiber of claim 48 containing up to about 1.5 weight percent iron oxide calculated as $Fe_2O_3$.

50. The fiber of claim 48 containing up to about 3.5 weight percent alumina.

51. The fiber of claim 48 containing up to about 2.5 weight percent alumina.

52. The fiber of claim 48 wherein said fiber exhibits a linear shrinkage of less than about 5% at 1260° C. for 24 hours.

53. The fiber of claim 48 wherein said fiber exhibits a linear shrinkage of about 20% or less at 1330° C. for 24 hours.

54. The fiber of claim 48 wherein said fiber demonstrates a recovery of at least about 5% after 50% compression following exposure to a service temperature of 1260° C.

55. A high temperature resistant fiber containing article selected from the group consisting of bulk fiber, blankets, needled blankets, papers, felts, cast shapes, vacuum cast forms, and compositions, said article comprising the fiber of claim 48.

56. A method of insulating an article, including disposing on, in, near or around the article, a thermal insulation material having a maximum service temperature of 1330° C. or greater, said insulation material comprising the fiber of claim 48.

* * * * *